(12) United States Patent
Szuba

(10) Patent No.: US 6,367,618 B1
(45) Date of Patent: Apr. 9, 2002

(54) FRICTION ROLL CONVEYOR CLUTCH APPARATUS

(75) Inventor: Philip S. Szuba, Clinton Township, MI (US)

(73) Assignee: Unova IP Corp., Woodland Hills, CA (US)

( * ) Notice: Subject to any disclaimer, the term of this patent is extended or adjusted under 35 U.S.C. 154(b) by 0 days.

(21) Appl. No.: 09/546,876

(22) Filed: Apr. 10, 2000

(51) Int. Cl.$^7$ ............................................. B65G 13/073
(52) U.S. Cl. ................................. 198/791; 198/781.01
(58) Field of Search ...................... 198/781.01, 781.02, 198/781.04, 789, 791

(56) References Cited

U.S. PATENT DOCUMENTS

| | | |
|---|---|---|
| 3,667,589 A | 6/1972 | Constable |
| 3,729,088 A | 4/1973 | Stein et al. |
| 4,103,516 A | 8/1978 | Marcin |
| 4,286,441 A | 9/1981 | Scheneman, Jr. et al. |
| 4,325,474 A | 4/1982 | Rae |
| 4,733,772 A * | 3/1988 | Potter .......................... 198/789 |
| 5,038,922 A * | 8/1991 | Collins et al. ............... 198/791 |
| 5,188,215 A * | 2/1993 | Reizler ........................ 198/791 |

FOREIGN PATENT DOCUMENTS

JP          61-254405          11/1986

* cited by examiner

Primary Examiner—Christopher P. Ellis
Assistant Examiner—Mark A. Deuble
(74) Attorney, Agent, or Firm—Reising, Ethington, Barnes, Kisselle, Learman & McCulloch, P.C.

(57) ABSTRACT

A clutch that adjusts the amount of torque transmitted to a transportation roller in a friction roll line shaft conveyor. The clutch includes a driver bevel gear that rotatably mounts on a line shaft of the conveyor and intermeshes with and drives a driven bevel gear that is fixed to a roller shaft of the conveyor. The driver bevel gear and the driven bevel gear couple drive power from the line shaft to the roller shaft. A compression spring is positioned between the driver bevel gear and a first stop collar. A second stop collar is positioned next to the driver bevel gear and opposite the spring. An annular hub supports the driver bevel gear, the spring and the stop collars and is supportable on and rigidly connectable to the conveyor line shaft.

21 Claims, 5 Drawing Sheets

FRICTION ROLL CONVEYOR CLUTCH APPARATUS

TECHNICAL FIELD OF THE INVENTION

This invention relates generally to a friction roll conveyor clutch apparatus for adjusting the amount of torque transmitted to transportation rollers in a friction roll line shaft conveyor.

BACKGROUND OF THE INVENTION

In automated material handling, conveyors are used to transmit driving force to media that must be transported from one location to another. This driving force is applied in a manner that advances the media in a desired material flow direction. One type of conveyor commonly used in material handling is a friction roll conveyor. Friction roll conveyors are distinguishable from other conveyors because they do not include endless conveyor "belts". Instead, such conveyors transmit driving force from a conveyor motor to transported media by driving a series of transportation rollers that support the media directly. In friction roll conveyors the motor is generally connected to and rotates a line shaft. A plurality of roller shafts are connected to and driven by the line shaft through bevel gears. Two or more transportation rollers are generally fixed in spaced locations along each roller shaft.

Because of part accumulations, jams and other blockages can occur on such conveyors, it is desirable to incorporate means for limiting the amount of torque transmitted to the transportation rollers of such conveyors. By limiting the amount of torque that a drive motor can transmit to the transportation rollers, the rollers are allowed to stop rotating completely when the articles supported on them are jammed or blocked and forced to stop moving or slow significantly. This can prevent damage to the rollers and other conveyor drive components as well as the articles being transported on the conveyor and permit a plurality of articles to accumulate on the conveyor.

In some friction roll conveyors that include transportation rollers mounted on and rotated by rotating roller shafts, the shafts are designed to slip in relation to the rollers. This allows the rollers to stop or slow should an article supported on them be jammed or blocked. The maximum amount of torque that can be transmitted from a roller shaft to a transportation roller before the shaft begins slipping within the roller is limited by the amount of friction between the roller and shaft. The amount of friction between roller and shaft is related to the weight of the media supported by the roller, the clearance between the roller and shaft as well as the shaft and roller material. The friction between rollers and roller shafts in such conveyors is not operator-adjustable and unplanned and unwanted slippage can occur even when conveyed articles are not jammed or blocked in any way. Unwanted slippage can result from variations in the weight of transported articles that changes the frictional force or torque between supporting roller shafts and transportation rollers. In addition, the intrusion of substances such as metal cutting lubricants between the transportation rollers and their supporting shafts can unpredictably reduce frictional force and driving force transmission. Such factors make it difficult to accurately predict and control the speed at which a conveyor will transport media as well as when a part will stall on the conveyor.

More recent friction roll conveyor designs include provisions for adjusting the amount of torque transmitted to transportation rollers and provide greater control and predictability. For example, as shown in FIG. 1 of the drawings, the prior art includes a line shaft conveyor clutch 10 that includes a compression spring 12 coaxially disposed around a line shaft 14 between a driver bevel gear 16 and a clamp collar 18. The driver bevel gear 16 is fixed against axial movement away from the spring 12 by a second clamp collar 20 that is fixed to the line shaft 14 axially opposite the spring 12 but may be moved to adjust spring compression. The conveyor clutch 10 of FIG. 1 also includes a first driven thrust washer 22 supported on the line shaft 14 between the driver bevel gear 16 and the second clamp collar 20 and a second driven thrust washer 23 supported on the line shaft 14 between the driver bevel gear 16 and the first clamp collar 18. Prior art clutches having designs similar to that shown in FIG. 1 are hard to adjust, and are complex and expensive both to make and to assemble on a conveyor. To adjust spring compression, an operator must estimate the amount of compression change required, manually compress or decompress the spring 12, then loosen, reposition and tighten the clamp collar 18 while attempting to hold the spring 12 at the estimated degree of compression. Clutches of the type shown at 10 in FIG. 1 cannot be assembled separately and stocked as inventory because their various parts can only be assembled together if the clamp collars 18, 20 are fixed to a line shaft 14. Because it cannot be preassembled, the time required for assembling a conveyor that includes such clutches is greater than it would otherwise be. This is because conveyor assembly must include the steps of assembling the clutch 10 by sliding each separate component 20, 22, 16, 12 and 18, in order, onto the line shaft 14 and properly positioning each component before tightening the clamp collars 20, 18. Clutch maintenance and repair is also time-consuming because each component must be disassembled and removed from the line shaft 14, then returned to the line shaft 14 in order and properly positioned before being secured. Moreover, unless the clutch to be repaired is located at the end of the line shaft 14, other clutches supported at spaced-apart locations along the line shaft must also be disassembled before they can be removed to allow access to the damaged clutch. The components of all the removed clutches must then be individually replaced, in order, and properly repositioned on the line shaft when repairs are complete.

Another friction roll conveyor clutch design that provides an adjustment for the amount of torque transmitted to transportation rollers is disclosed in Japanese Patent 61-254405 issued in 1986. Each clutch disclosed in this Japanese patent includes a compression spring that is coaxially disposed around a line shaft between a driver bevel gear and a jam nut. The driver bevel gear is fixed against axial movement away from the spring by a collar that is fixed to the line shaft axially opposite the spring. The friction roll conveyor clutch apparatus disclosed in the Japanese patent also includes a driven thrust washer that is supported on the line shaft between the driver bevel gear and the spring. The jam nut is coaxially and threadedly engaged on the line shaft so that spring compression can be adjusted by axially advancing or retracting the jam nut along the line shaft. However, a friction roll conveyor clutch apparatus constructed according to the Japanese patent cannot be assembled and stocked as inventory, be quickly installed by pre-assembling before mounting on a line shaft, and cannot be quickly removed from a line shaft as a single unit for maintenance or repair.

SUMMARY OF THE INVENTION

A clutch apparatus is provided that adjusts the amount of torque transmitted to a transportation roller in a friction roll line shaft conveyor. The conveyor includes a line shaft rotatably driven by a conveyor motor and each transportation roller is fixed on a roller shaft that is rotatably driven by the line shaft. The clutch apparatus includes a driver bevel gear configured to be rotatably mounted around the conveyor line shaft and to drivingly engage a driven bevel gear fixed to the roller shaft to couple drive power from the line shaft to the roller shaft. A compression spring is coaxially disposed between the driver bevel gear and a first stop collar. A second stop collar is coaxially disposed adjacent the driver bevel gear axially opposite the spring.

What characterizes the invention is that the clutch includes an annular hub that is coaxially supportable on and rigidly connectable to the conveyor line shaft and coaxially supports the driver bevel gear, the spring and the stop collars. Therefore, the clutches of a friction roll conveyor apparatus constructed according to the invention may be assembled and stocked as inventory, quickly installed by pre-assembling before mounting on the line shaft, and quickly removed from the line shaft as a single unit for maintenance or repair. A clutch constructed in this manner may also be readily retrofit on the line shafts of existing conveyors.

According to another aspect of the invention, the clutch includes an adjustable stop collar in the form of a jam nut. The use of a jam nut instead of a more permanent stop such as a clamp collar allows an operator to adjust spring compression more accurately and quickly by simply rotating the jam nut. A second jam nut may be incorporated to provide further security against "unwinding" and a resulting inadvertent decrease in spring tension.

The invention also includes a method for assembling a friction roll conveyor. The method includes pre-assembling the clutch, providing a driven bevel gear on one end of a roller shaft and providing the clutch on the line shaft such that the driving bevel gear of the clutch operatively engages the driven bevel gear.

Objects, features and advantages of this invention are to provide a friction roll conveyor having clutches that can be easily reconfigured to accommodate conveyed media of different weights and surface textures, that can compensate for the presence of substances that affect the ability of transportation rollers to move the media at constant and predictable speeds, that allow an operator to compensate for such factors by adjusting the axial position of a jam nut or jam nuts of each clutch, that can be pre-assembled and therefore may be stocked as inventory and installed quickly in a conveyer, that minimize clutch wear by allowing easy and accurate adjustment, that include relatively simple components that are inexpensive to make, and that are readily retro fit into existing line shaft conveyer designs.

BRIEF DESCRIPTION OF THE DRAWINGS

These and other objects, features and advantages of this invention will be apparent from the following detailed description of the preferred embodiment and best mode, appended claims and accompanying drawings in which:

DETAILED DESCRIPTION OF THE PREFERRED EMBODIMENTS

A conveyor clutch apparatus 30 for adjusting the amount of torque transmitted to a transportation roller in a friction roll line shaft conveyer 32 is generally shown in FIGS. 2 through 6.

Figure 1:
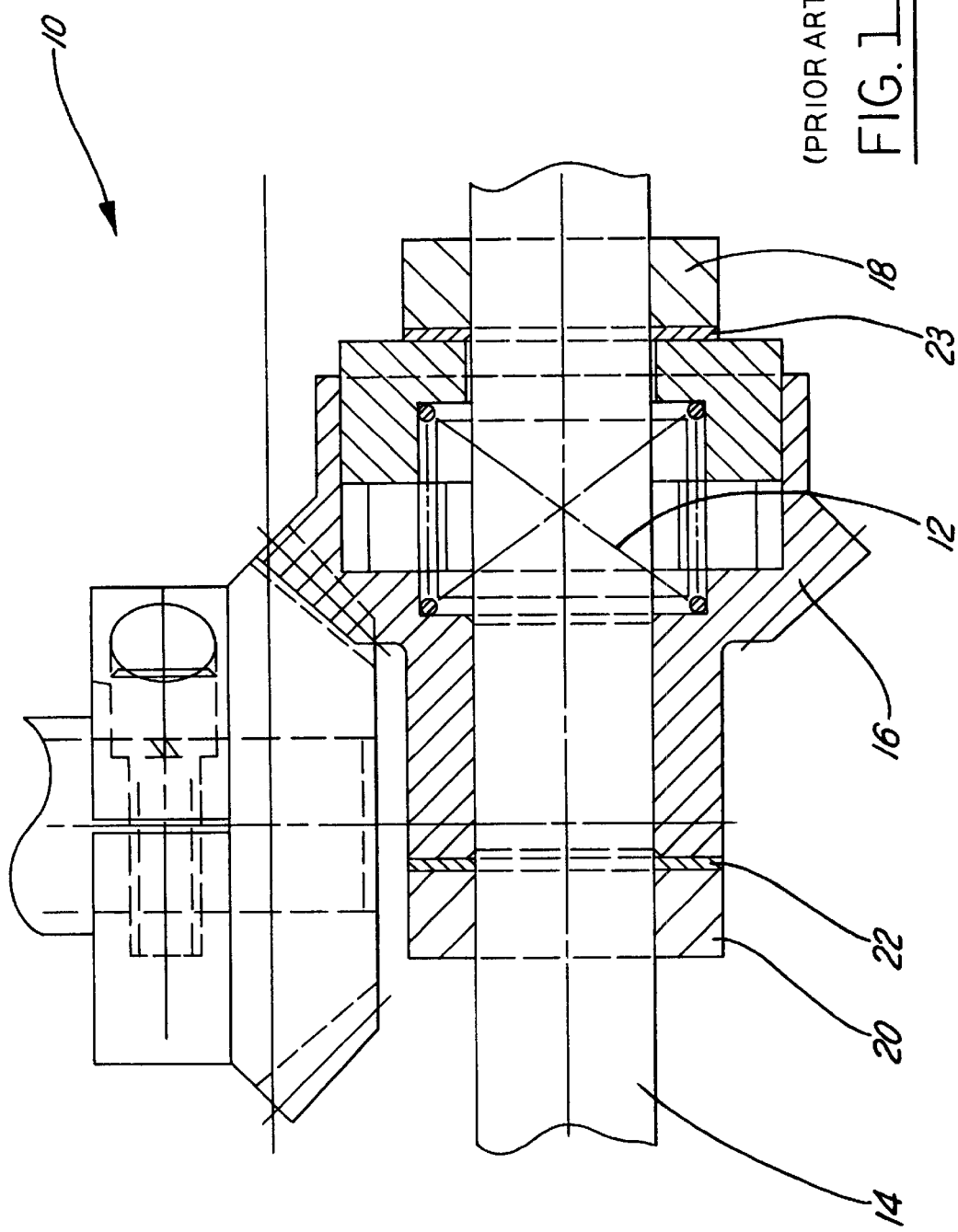
FIG. 1 is a cross-sectional side view of a prior art spring-loaded clutch.
Figure 2:
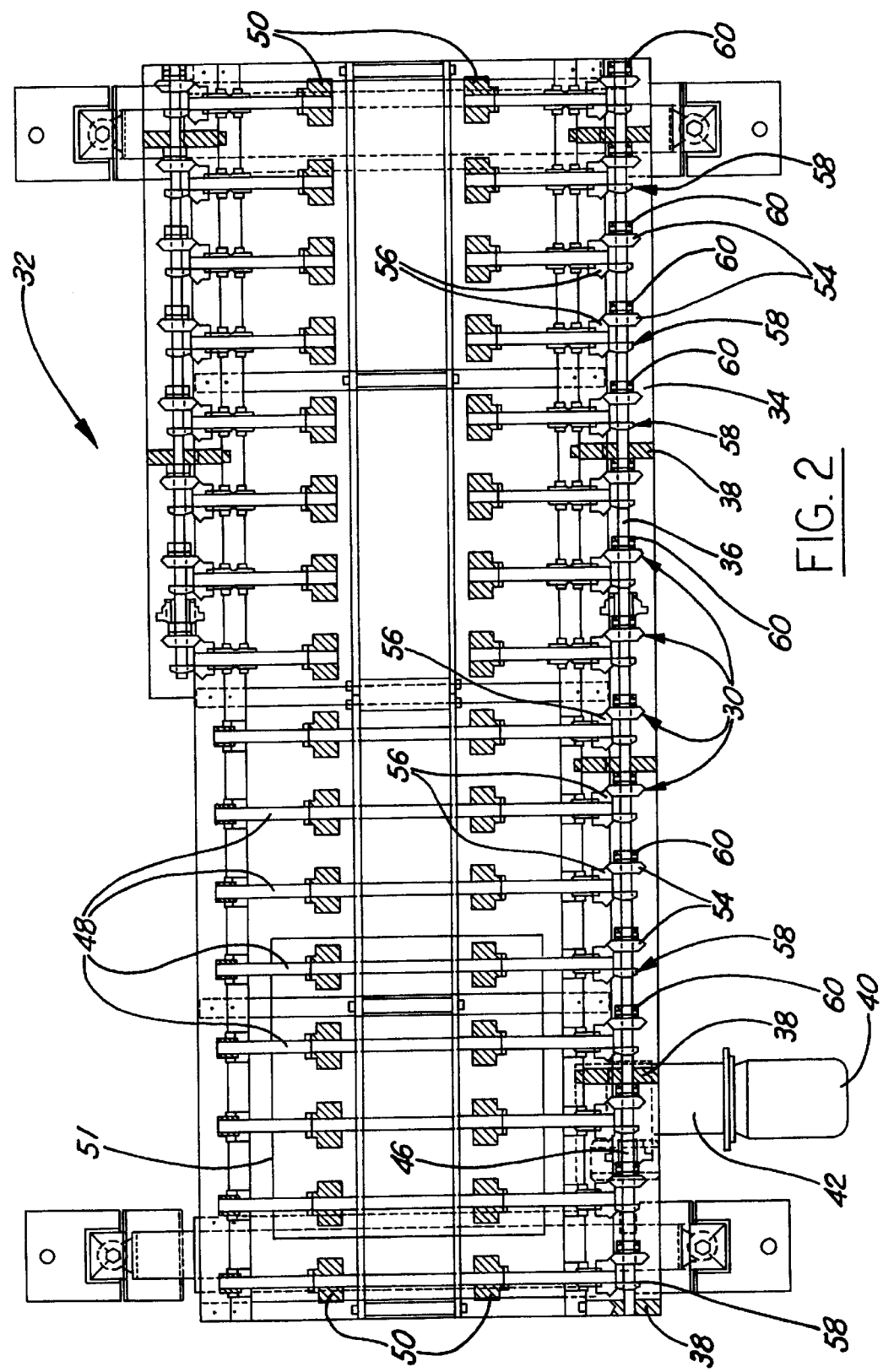
FIG. 2 is a plan view of a conveyor including spring-loaded clutches constructed according to the invention.
Figure 3:
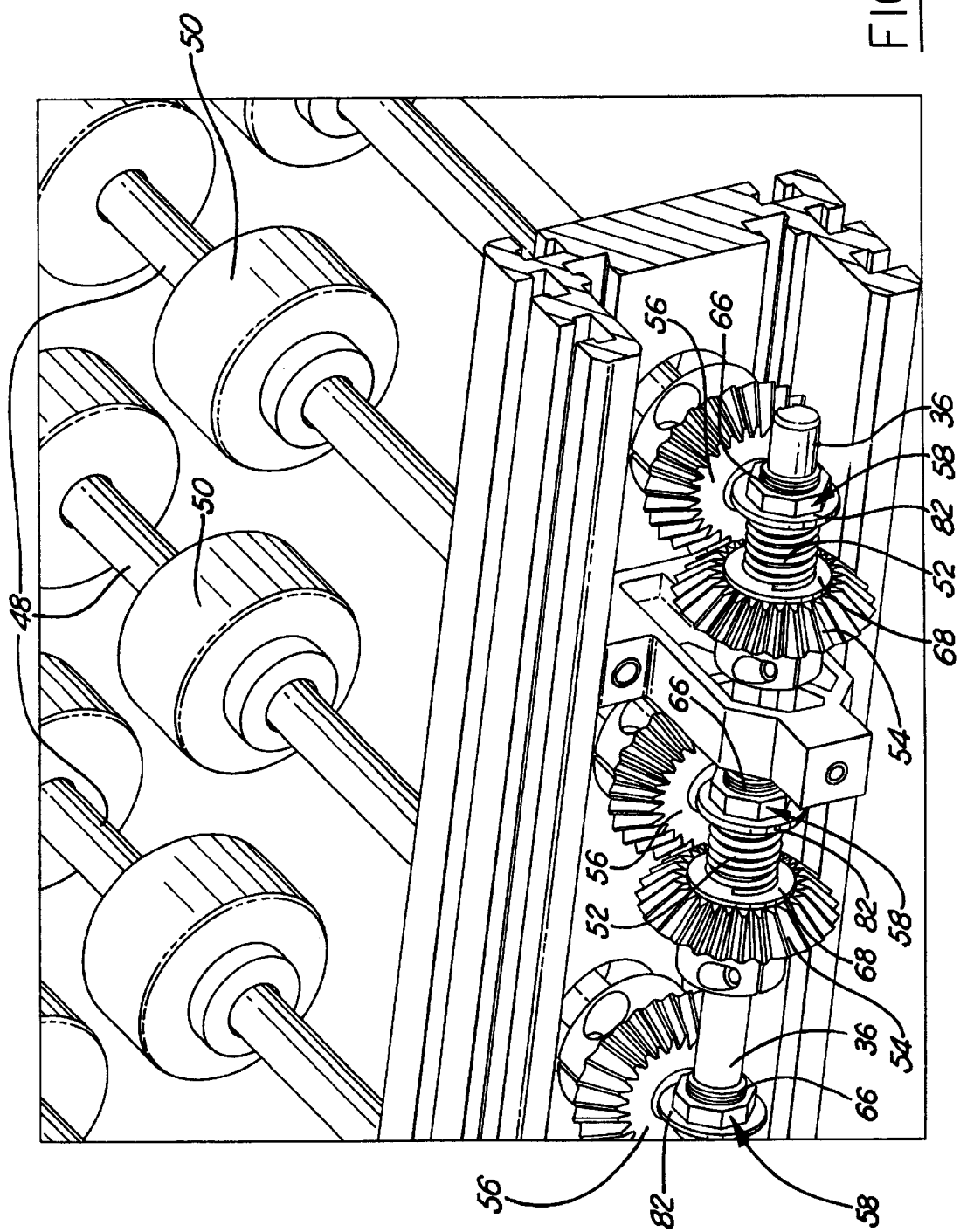
FIG. 3 is a partial perspective view of the spring-loaded clutches of FIG. 2 installed in a conveyor.

The conveyor clutch apparatus 30 is shown installed on a friction-roll line shaft 36 of the conveyor 32 in FIGS. 2 and 3. The conveyor 32 shown in FIGS. 2 and 3 is typical of friction roll line shaft conveyors in that it includes a frame 34 and a line shaft 36 supported longitudinally on the frame 34 adjacent one side of the frame 34. The line shaft 36 is rotatably supported by bearings 38 disposed at spaced locations along the frame 34 and is operatively connected to a motor 40 through a gear reducer 42. The gear reducer 42 is supported on the conveyor frame 34 and the motor 40 is supported on the gear reducer 42. An output shaft of the gear reducer 42 extends parallel to the line shaft 36 and carries a driving gear 44 and meshes with a driven gear 46 mounted on the line shaft 36. When operating, the motor 40 turns gears in the gear reducer 42 that turn the output shaft and the line shaft 36 through the output shaft driving gear 44 and the line shaft driven gear 46.

A plurality of roller shafts 48 are supported transversely on the conveyor frame 34 in a perpendicular relationship to the line shaft 36 and in a laterally spaced-apart relation to each other. One end of each roller shaft 48 is operatively connected to the line shaft 36. The line shaft 36 transfers torque to the roller shafts 48 to rotate the roller shafts 48. Two transportation rollers 50 are co-axially fixed at spaced locations along each of the roller shafts 48. The transportation rollers 50 are positioned to gravitationally support and propel conveyer transported media 51 as the roller shafts 48 are rotationally driven by the motor 40 through the gear reducer 42 and the line shaft 36.

Figure 5:
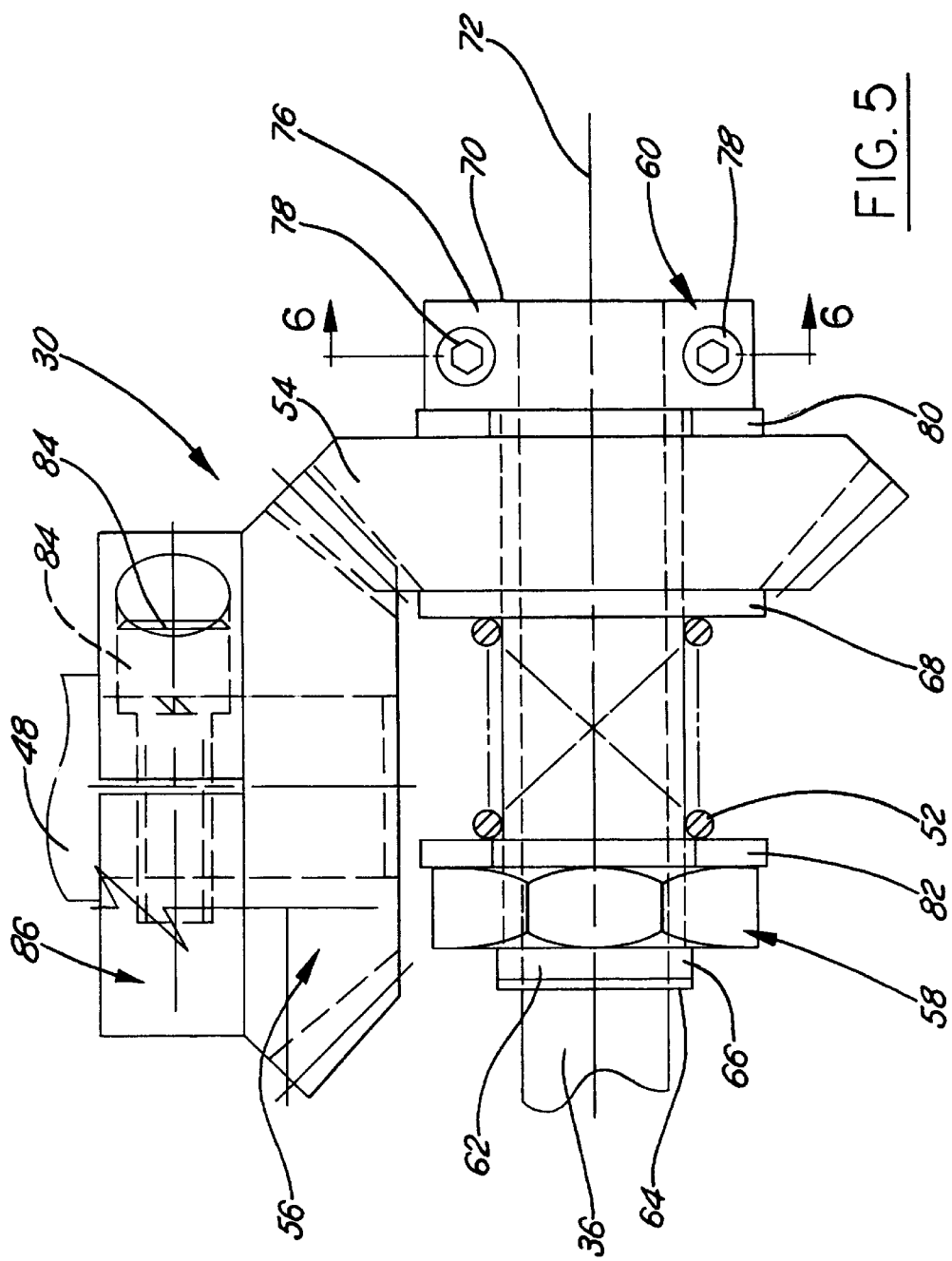
FIG. 5 is a front view of one of the spring-loaded clutches of FIG. 2.

As shown in FIGS. 2, 3 and 5, a clutch apparatus 30 is operatively connected between each roller shaft 48 and the line shaft 36. Each clutch apparatus 30 is configured to couple drive power from the line shaft 36 to one of the roller shafts 48 through one of a plurality of driver bevel gears 54 rotatably mounted at spaced locations along the line shaft 36 and a driven bevel gear 56 mounted on one end of the roller shaft 48.

Each clutch apparatus 30 shown in FIGS. 2 and 3 is generally identical to the other clutch apparatuses 30 shown spaced along the line shaft 36. Therefore, to simplify the following description, only a single representative one of those clutch apparatuses 30 will be described in detail.

Figure 4:
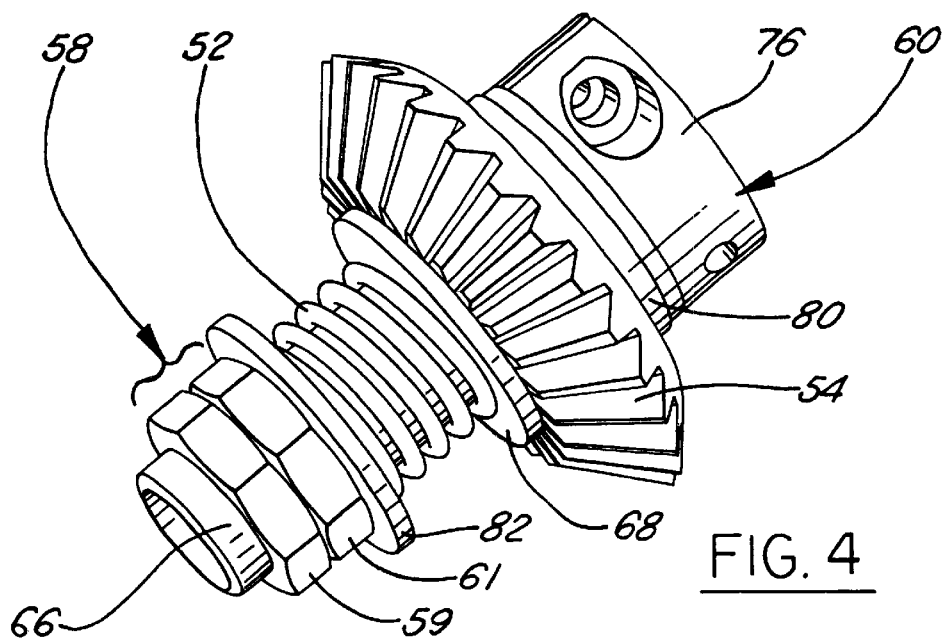
FIG. 4 is a perspective view of a spring-loaded clutch constructed according to a second embodiment of the invention.

As best shown in FIGS. 4 and 5, the clutch apparatus 30 includes a coil compression spring 52 co-axially disposed around the line shaft 36 between a corresponding one of the driver bevel gears 54 and a first stop collar 58 supported on the line shaft 36. The first stop collar 58 is adjustably supported for axial advancement and withdrawal relative to the spring 52 to allow an operator to adjust spring compression by moving the first stop collar 58. The first stop collar 58 may include a single jam nut as shown in FIGS. 2, 3 and 5 or axially outer and inner jam nuts 59, 61 as shown in FIG. 4. The jam nuts 59, 61 of the FIG. 4 embodiment may be tightened against one another axially to lock the stop collar 58 in position and to prevent the inadvertent release of spring tension.

A second stop collar 60 is co-axially disposed adjacent each driver bevel gear 54 axially opposite one of the springs 52. The clutch apparatus 30 also includes an annular hub 62 co-axially supported on and rigidly connected to the line shaft 36. The annular hub 62 coaxially supports the driver bevel gear 54, the spring 52 and the stop collars 58, 60. In the present embodiment, the second stop collar 60 is integrally formed with the hub 62 as a single unitary piece.

The first stop collar 58 is adjustably supported on the hub 62 for axial advancement and withdrawal relative to the spring 52. This allows an operator to adjust spring compression by alternately compressing and decompressing the spring 52 by axially advancing and withdrawing the first stop collar 58, respectively. A first end 64 of the hub 62 includes a threaded portion 66. The first stop collar 58, in either the single jam nut form shown in FIGS. 2, 3 and 5 or the two jam nut form shown in FIG. 4, is threadedly engaged on the threaded portion 66 of the hub 62 for axial advancement and withdrawal relative to the spring 52. An operator can easily adjust the compression of the spring 52 by axially advancing or withdrawing the first stop collar 58 along the threaded portion 66 of the hub 62. Where, as in the FIG. 4 embodiment, the first stop collar 58 includes two jam nuts 59, 61, the operator must first relieve any axial compression between the jam nuts 59, 61 by either unscrewing the axial outermost 59 of the two jam nuts or screwing an axially innermost 61 of the nuts inward.

An annular driven thrust washer, shown at 68 in FIG. 5, is supported on the hub 62 between the driver bevel gear 54 and the spring 52 to prevent direct frictional contact between the spring 52 the driver bevel gear 54 and to evenly distribute forces between the spring 52 and the driver bevel gear 54.

Figure 6:
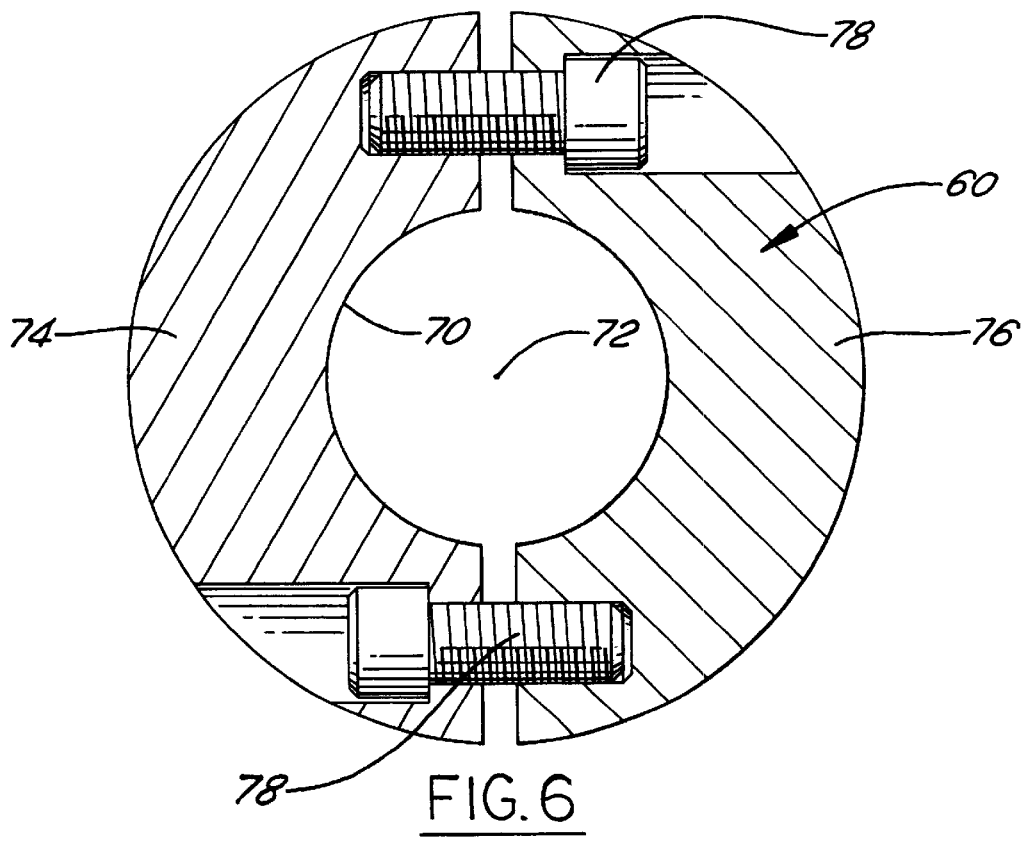
FIG. 6 is a cross-sectional end view of one of the spring-loaded clutches of FIG. 2 taken along line 6—6 of FIG. 5.

The second stop collar 60 of the two stop collars 58, 60 extends integrally and radially outward from around a second end 70 of the hub 62 opposite the threaded portion 66 of the hub 62 and forming an annular flange. As is best shown in FIG. 6, the annular flange 60 has a generally circular cross-section taken perpendicular to a central rotational axis 72 of the line shaft 36. The annular flange 60 is split along one diameter of the flange forming a pair of opposed "C-shaped" flange halves 74, 76. A pair of clamp screws 78 spans and connects the two split halves 74, 76 to each other. This allows an installer to securely clamp the flange 60 onto the line shaft 36 by advancing the clamp screws 78 and drawing the flange halves 74, 76 together around the line shaft 36.

A second annular thrust washer, shown at 80 in FIG. 5, is disposed around the hub 62 between the annular flange 60 and the driver bevel gear 54. The second thrust washer 80 prevents direct frictional contact between the annular flange of the hub 62 and the driver bevel gear 54 and acts with the first driven thrust washer 68 to transmit torque from the line shaft 36 to the driver bevel gear 54.

A third thrust washer, shown at 82 in FIG. 5, is disposed around the hub 62 between the first stop collar 58 and spring 52. The third thrust washer 82 prevents direct frictional contact between the spring 52 and the first stop collar 58 and helps to evenly distribute spring forces exerted on the first stop collar 58. The axially outwardly-directed force of the compressed spring 52 sandwiches the driver bevel gear 54 between the first and second thrust washers 68, 80 and provides sufficient axial force against the third thrust washer 82 to cause all hub mounted elements, including the first stop collar 58, the three thrust washers 68, 80, 82, the spring 52 and the driver bevel gear 54, to rotate with the line shaft 36. The amount of axial outward pressure exerted by the spring 52 on the other hub-mounted elements of the clutch apparatus 30 determines the amount of torque that the clutch can transmit to the roller shaft 48 without slipping.

Because the first stop collar 58, thrust washers, spring 52 and driver bevel gear 54 of each clutch apparatus 30 are coaxially mounted on a common hub 62, an assembler is able to install a plurality of the clutches 30 along a line shaft 36 in a conveyor 32 assembly process more quickly than would be possible with prior art systems. This is because each pre-assembled clutch 30 can be slid along the line shaft 36 and anchored in a position to engage a bevel gear 56 of a corresponding roller shaft 48 rather than having to slide each separate component along the line shaft 36 in the proper order and to then assemble each clutch unit 30 on the line shaft 36. Still further, this allows a maintenance technician to remove whole clutch units 30 along the line shaft 36 to replace a component in a single clutch apparatus 30 rather than having to disassemble each clutch apparatus 30 before removal.

Because one of the stop collars 58, 60 of each clutch 30 is a jam nut threadedly engaged on its respective hub 62 for axial advancement and withdrawal relative to its respective spring 52, an operator can easily and accurately adjust the amount of torque that the line shaft 36 can transmit to transported media 51 through each pair of transportation rollers 50 along the conveyer 32 by simply turning the first stop collar 58 to adjust spring compression.

In practice, according to the invention, a friction roll conveyer clutch apparatus 30 can be assembled and installed in a conveyor 32 manufacturing process by first pre-assembling the clutch. Clutch pre-assembly includes providing the driving bevel gear 54, the thrust washers 68, 80, 82, the spring 52 and the stop collars 58, 60 on the hub 62. In the preferred embodiment, one stop collar 60 is integrally formed with the hub 62 and the other stop collar 58 is threaded onto the second end of the hub 62. Driven bevel gears 56 are fixed on one end of each roller shaft 48 by sliding each driven bevel gear 56 over one end of each roller shaft 48 and tightening two clamp screws 84 positioned to constrict a split clamp collar 86 of the driven bevel gear 56 around the roller shaft 48. Each pre-assembled clutch 30 is then slid along the line shaft 36 such that the driving bevel gear 54 of each clutch 30 is in a position along the line shaft 36 to operatively engage a corresponding driven bevel gear 56. The two clamp screws 78 disposed in the integral flange 76 of each hub 62 are then tightened to constrict and to clamp each hub 62 around the line shaft 36. The line shaft 36 may then be moved in position on the conveyor frame 34 such that the driver bevel gear 54 of each clutch 30 engages a corresponding driven bevel gear 56.

A friction roll conveyer 32 that includes a clutch 30 constructed according to the invention can be easily reconfigured to accommodate conveyed media 51 of different weights and surface textures or to compensate for the presence of coolant or machine oil that might effect the ability of a transportation roller to move the media 51 at a constant predictable speed. Again, an operator need only adjust the axial position of the first stop collar 58 of each clutch an equal amount, i.e., an equal number of turns, to compensate for such factors. In this way an operator can accurately adjust the maximum amount of torque that each clutch will transmit before slipping. The pre-assembly of each clutch 30 is a simple operation that allows assemblers to set spring compression by simply tightening the first stop collar 58 to the same predetermined axial position in each clutch 30 to be installed in a given conveyor 32. After pre-assembly, each clutch 30 can be stocked as inventory and can be easily assembled in a conveyor 32 by simply sliding a group of the clutches 30 unto a line shaft 36 then locking them down in their correct respective positions as described above. The ease of adjustment afforded by incorporating clutches 30 constructed according to the invention and the increase accuracy of adjustment will allow prolonged conveyor 32 life due to minimized clutch wear. The components of each clutch apparatus 30 are relatively simple and inexpensive to make as well as being easy and inexpensive to assemble and to install. The design of the conveyer clutch apparatus 30 also allows the clutches to be readily retro fit into existing line shaft conveyor designs.

This description is intended to illustrate certain embodiments of the invention rather than to limit the invention. Therefore, descriptive rather than limiting words are used. Obviously, it is possible to modify this invention from the described construction. Within the scope of the claims, one may practice the invention other than as described.

What is claimed is:

1. A friction roll conveyor clutch apparatus for adjusting the amount of torque transmitted to a transportation roller in a friction roll line shaft conveyor, the conveyor comprising:
   a line shaft rotatably driven by a conveyor motor;
   a roller shaft rotatably driven by the line shaft;
   a transportation roller fixed on a roller shaft; and the clutch apparatus comprising:
      an annular hub coaxially supportable on and rigidly connectable to the line shaft,
      a driver bevel gear rotatably mounted on the annular hub to drivingly engage a driven bevel gear fixed to the roller shaft to couple drive power from the line shaft to the roller shaft;
      a compression spring coaxially received on the annular hub between the driver bevel gear and a first stop collar;
      a second stop collar received on the annular hub and coaxially disposed adjacent the driver bevel gear axially opposite the spring; and
      the annular hub coaxially supporting the driver bevel gear, the spring and the stop collars.

2. A friction roll conveyor clutch apparatus as defined in claim 1 in which the first stop collar is adjustably supported on the hub for axial advancement and withdrawal relative to the spring.

3. A friction roll conveyor clutch apparatus as defined in claim 2 in which:
   a first end of the hub includes a threaded portion; and
   the first stop collar comprises a first jam nut threadedly engaged on the threaded portion of the hub for axial advancement and withdrawal relative to the spring.

4. A friction roll conveyor clutch apparatus as defined in claim 3 in which the first stop collar comprises a second jam nut threadedly engaged on the threaded portion of the hub for axial advancement and withdrawal relative to the spring, the second jam nut being axially engageable with the first jam nut such that the jam nuts are locked against rotation relative to the hub.

5. A friction roll conveyor clutch apparatus as defined in claim 1 in which a driven thrust washer is supported on the hub between the driver bevel gear and the spring.

6. A friction roll conveyor clutch apparatus as defined in claim 5 in which:
   the second stop collar comprises an annular flange extending integrally and radially outward from and around the second end of the hub; and
   a second thrust washer is disposed around the hub between the annular flange and the driver bevel gear.

7. A friction roll conveyor clutch apparatus as defined in claim 6 in which a third thrust washer is disposed on the hub between the jam nut and the spring.

8. A friction roll conveyor apparatus comprising:
   a line shaft configured to be rotatably driven by a motor;
   a roller shaft operatively connected to and driven by the line shaft;
   a transportation roller coaxially fixed on the roller shaft;
   a spring-biased clutch operatively connected between the roller shaft and the line shaft and configured to couple drive power from the line shaft to the roller shaft through a driver bevel gear rotatably mounted on the line shaft and a driven bevel gear mounted on the roller shaft, the clutch including:
      a compression spring coaxially disposed between the driver bevel gear and a first stop collar;
      a second stop collar coaxially disposed adjacent the driver bevel gear axially opposite the spring; and
      an annular hub coaxially supported on and rigidly connected to the line shaft and configured to support the driver bevel gear, the spring and the stop collars.

9. A friction roll conveyor apparatus as defined in claim 8 in which the stop collar is adjustably supported on the hub for axial advancement and withdrawal relative to the spring.

10. A friction roll conveyor apparatus as defined in claim 9 in which:
    a first end of the hub includes a threaded portion; and
    the stop collar comprises a jam nut threadedly engaged on the threaded portion of the hub for axial advancement and withdrawal relative to the spring.

11. A friction roll conveyor apparatus as defined in claim 8 in which a driven thrust washer is supported on the line shaft between the driver bevel gear and the spring.

12. A friction roll conveyor apparatus as defined in claim 8 in which:
    the second stop collar comprises an annular flange extending integrally and radially outward from around the second end of the hub; and
    a thrust washer is disposed around the hub between the annular flange and the driver bevel gear.

13. A friction roll conveyor apparatus as defined in claim 10 in which a thrust washer is disposed around the hub between the jam nut and the spring.

14. A friction roll conveyor apparatus as defined in claim 8 in which the apparatus includes:
    a plurality of the roller shaft recited in claim 7, each roller shaft being operatively connected to and driven by the line shaft; and
    a plurality of the clutch recited in claim 7, each clutch being operatively connected between the line shaft and the end of a roller shaft, driver bevel gears of the clutches being rotatably mounted at spaced locations along the line shaft and drivingly engaged with respective driven bevel gears mounted on the respective roller shafts.

15. A friction roll conveyor apparatus as defined in claim 14 in which one of the stop collars of each clutch is a jam nut threadedly engaged on its respective hub for axial advancement and withdrawal relative to its respective spring.

16. A method for assembling a friction roll conveyor that includes a transportation roller fixed on a roller shaft that is operatively connected to and driven by a line shaft, a spring-biased multi-component clutch apparatus operatively connected between the roller shaft and the line shaft and configured to couple drive power from the line shaft to the roller shaft through a driver gear of the clutch apparatus that is rotatably mounted on the line shaft and that engages a driven gear fixed to the roller shaft; the method including the steps of:

pre-assembling the clutch apparatus by connecting the driver gear to a clutch portion of the clutch apparatus;

providing the driven bevel gear on the roller shaft;

providing the clutch apparatus on the line shaft after pre-assembling the clutch apparatus; and moving the pre-assembled clutch apparatus to a position along the line shaft where the driving bevel gear operatively engages the driven bevel gear.

17. The method of claim 16 in which:

the step of pre-assembling the clutch apparatus includes providing a hub portion of the clutch apparatus and providing the driving bevel gear, a spring and a stop collar of the clutch apparatus on a hub portion of the clutch apparatus; and the step of providing the clutch apparatus on the line shaft includes:

sliding the hub portion of the clutch apparatus along the line shaft to a position where the driving bevel gear of the clutch apparatus will operatively engage the driven bevel gear; and fixing the hub to the line shaft.

18. The method of claim 16 in which the step of pre-assembling the clutch includes:

providing the driving bevel gear on the hub;

providing the spring on the hub; and providing the stop collar on the hub by threading the stop collar onto a threaded portion of the hub.

19. The method of claim 16 in which the step of providing the driven bevel gear on the roller shaft includes:

sliding the driven bevel gear over one end of the roller shaft; and fixing the driven bevel gear to the roller shaft.

20. The method of claim 17 in which the step of providing a hub portion of the clutch apparatus includes providing a unitary hub.

21. The method of claim 17 in which the step of pre-assembling includes supporting the driving bevel gear and the stop collar on the hub such that the hub axially constrains the position of the driving bevel gear relative to the stop collar and confines the spring between them.

* * * * *